United States Patent [19]
Hoffmann et al.

[11] 3,713,526
[45] Jan. 30, 1973

[54] PACKAGING APPARATUS

[75] Inventors: Wolfgang Hoffmann, Beaconsfield, Quebec; Paul Wick, Valois, Quebec, both of Canada

[73] Assignee: Canadian International Paper Company, Montreal, Quebec, Canada

[22] Filed: Feb. 1, 1971

[21] Appl. No.: 111,580

Related U.S. Application Data

[62] Division of Ser. No. 734,029, June 3, 1968, Pat. No. 3,579,956.

[52] U.S. Cl. ................................................. 198/34
[51] Int. Cl. ............................................. B65g 47/26
[58] Field of Search ........ 198/24, 30, 34, 35; 53/159, 53/164; 214/6 F

[56] References Cited

UNITED STATES PATENTS

| 3,165,871 | 1/1965 | Roth | 53/159 X |
| 2,932,929 | 4/1960 | Fahrenbach | 53/159 |
| 2,878,919 | 3/1959 | Jones | 198/34 |

*Primary Examiner*—Edward A. Sroka
*Attorney*—Alan Swabey

[57] ABSTRACT

A commodity feeding apparatus for aligning and selectively feeding a commodity into a packaging station, the feeding apparatus having two advancing systems, one advancing faster than the other and moving selected of the commodities at a faster rate to separate the selected commodities from the remainder thereof and advance same into the packaging station.

16 Claims, 17 Drawing Figures

INVENTORS
Wolfgang HOFFMANN
Paul WICK

ATTORNEY

INVENTORS
Wolfgang HOFFMANN
Paul WICK

ATTORNEY

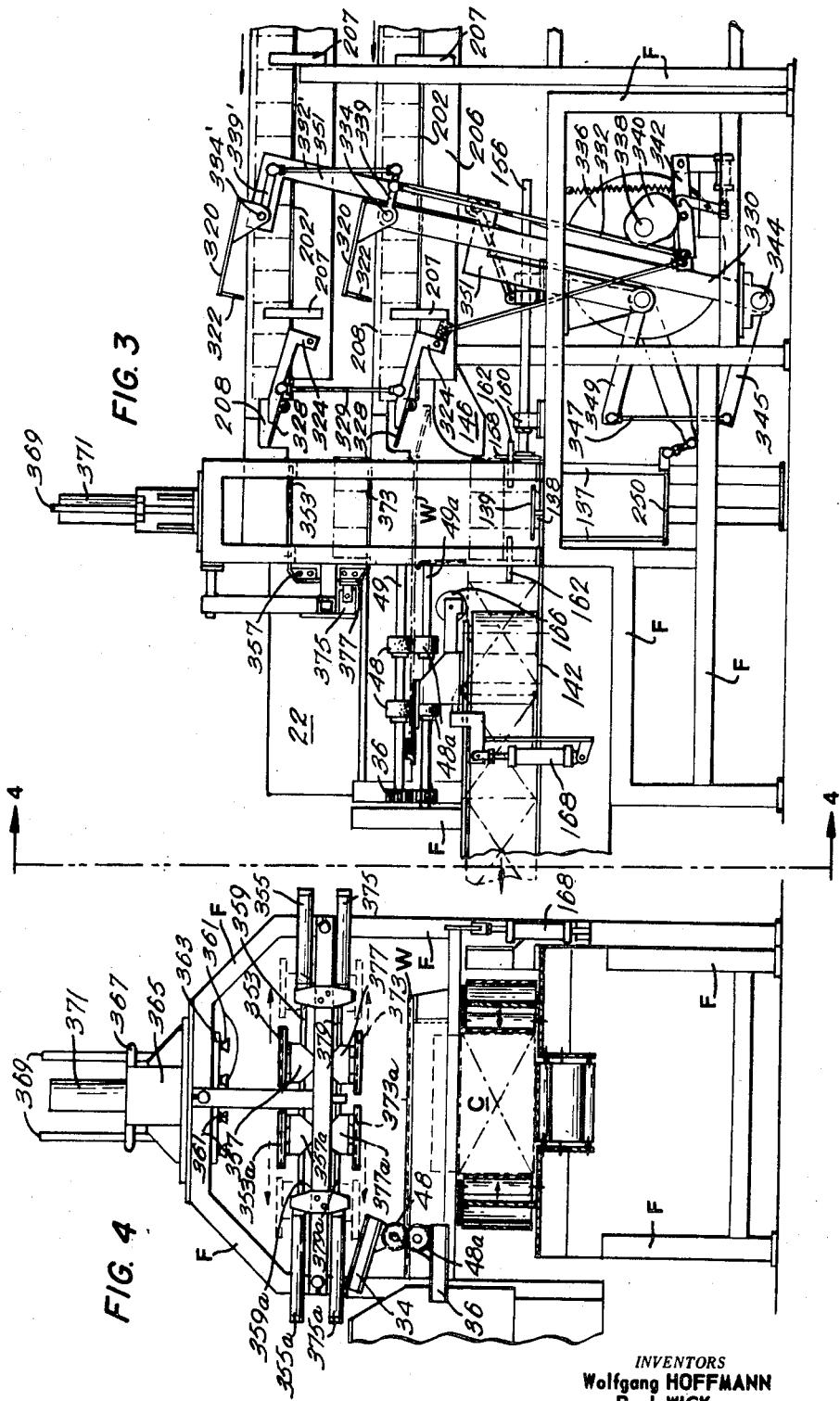

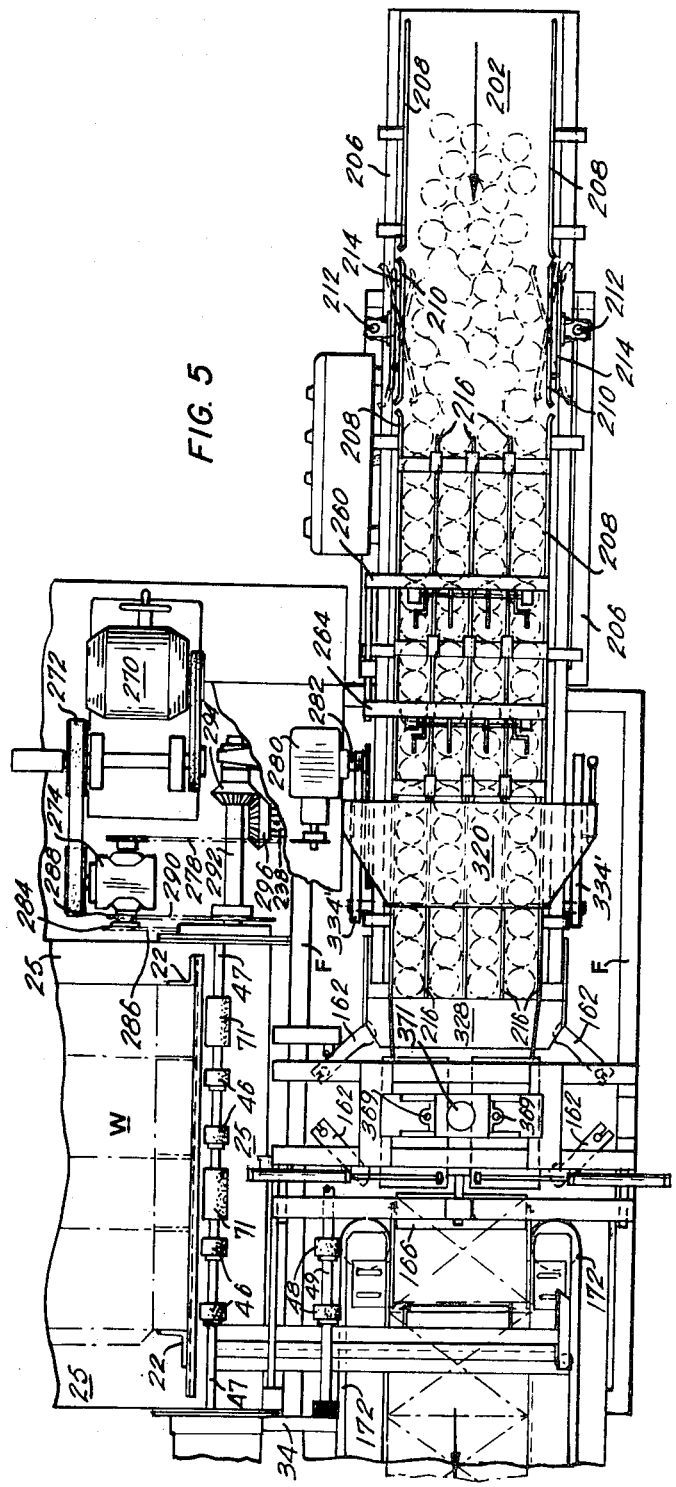

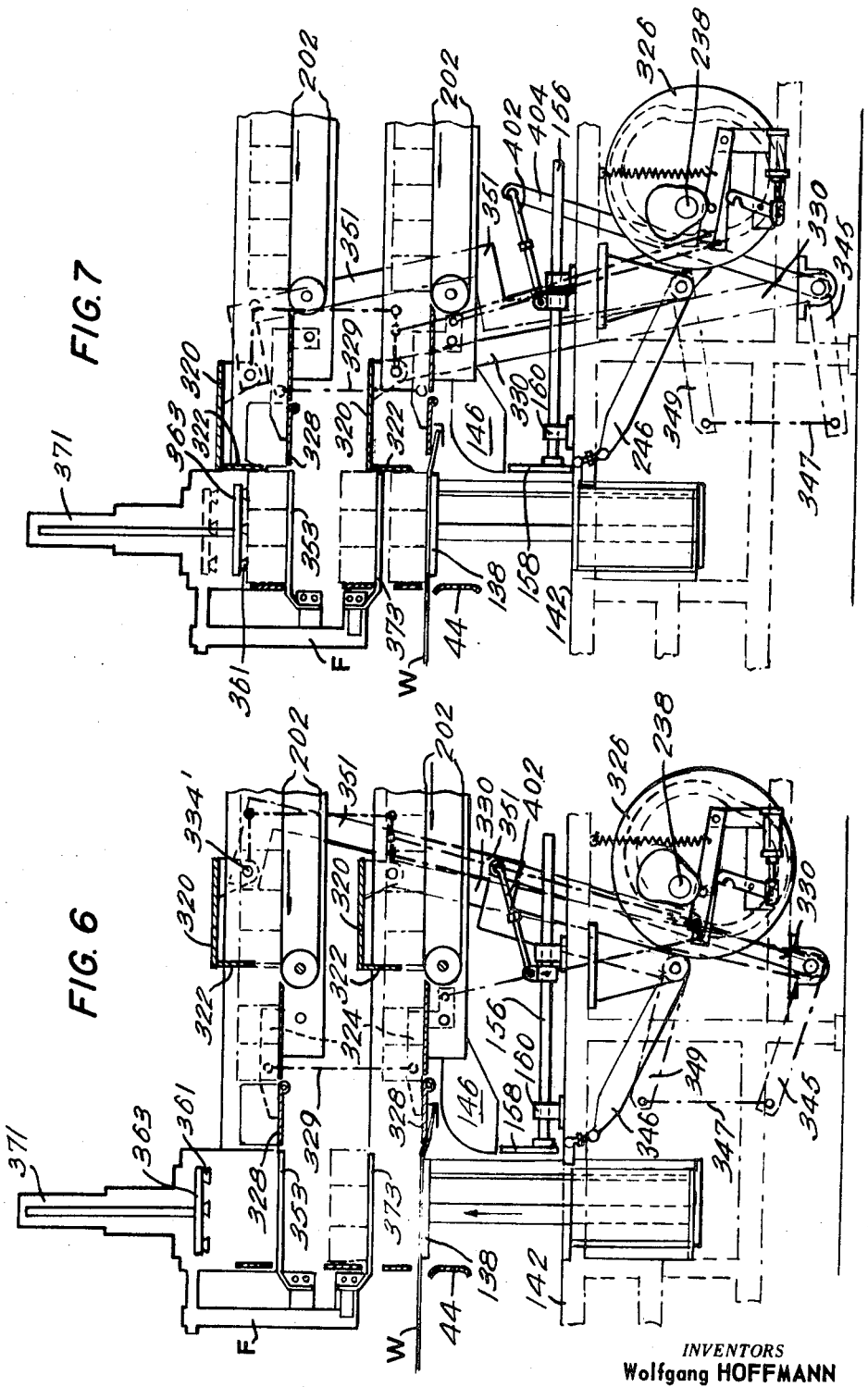

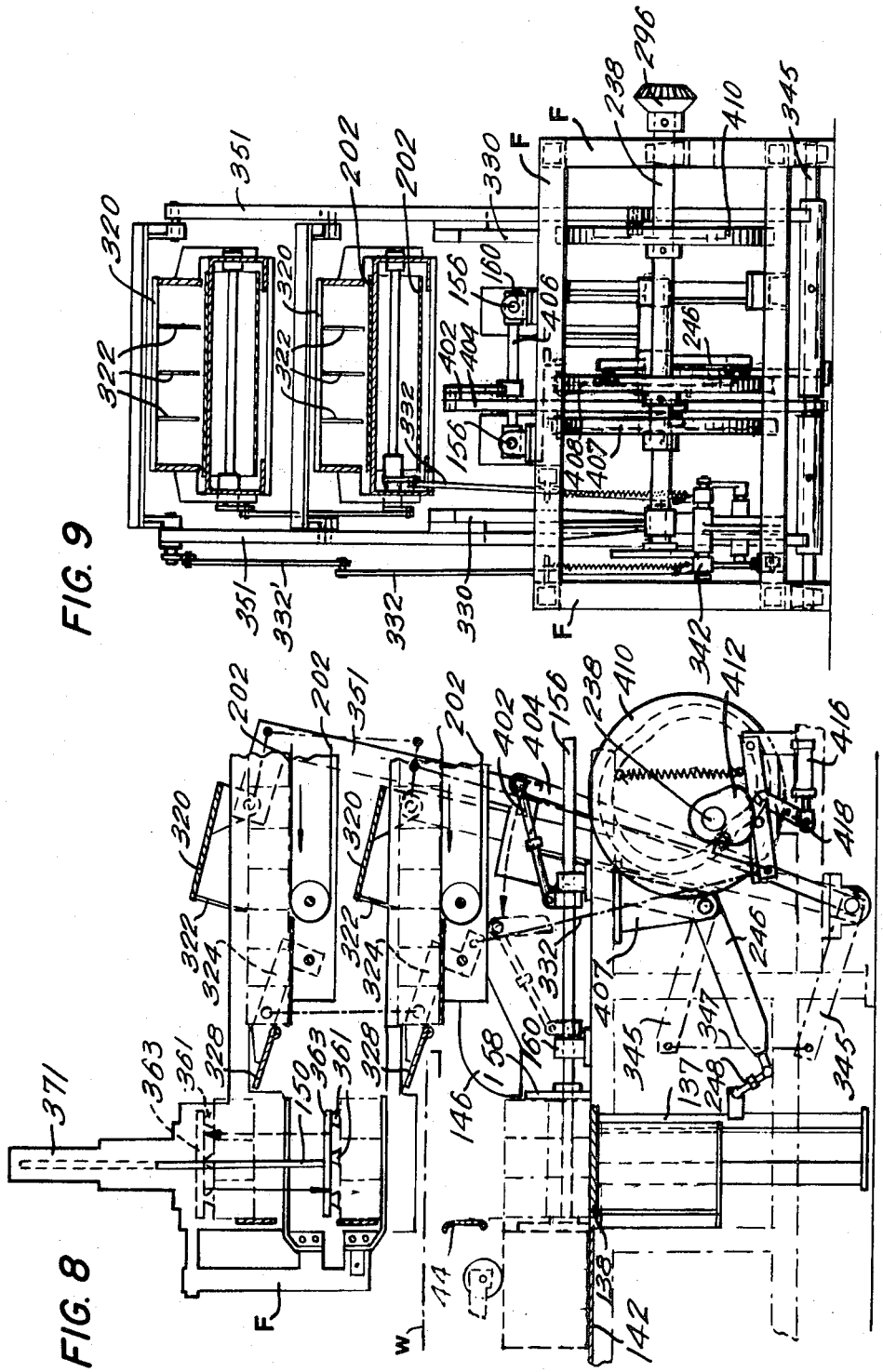

INVENTORS
Wolfgang HOFFMANN
Paul WICK

Alan Sinsley
ATTORNEY

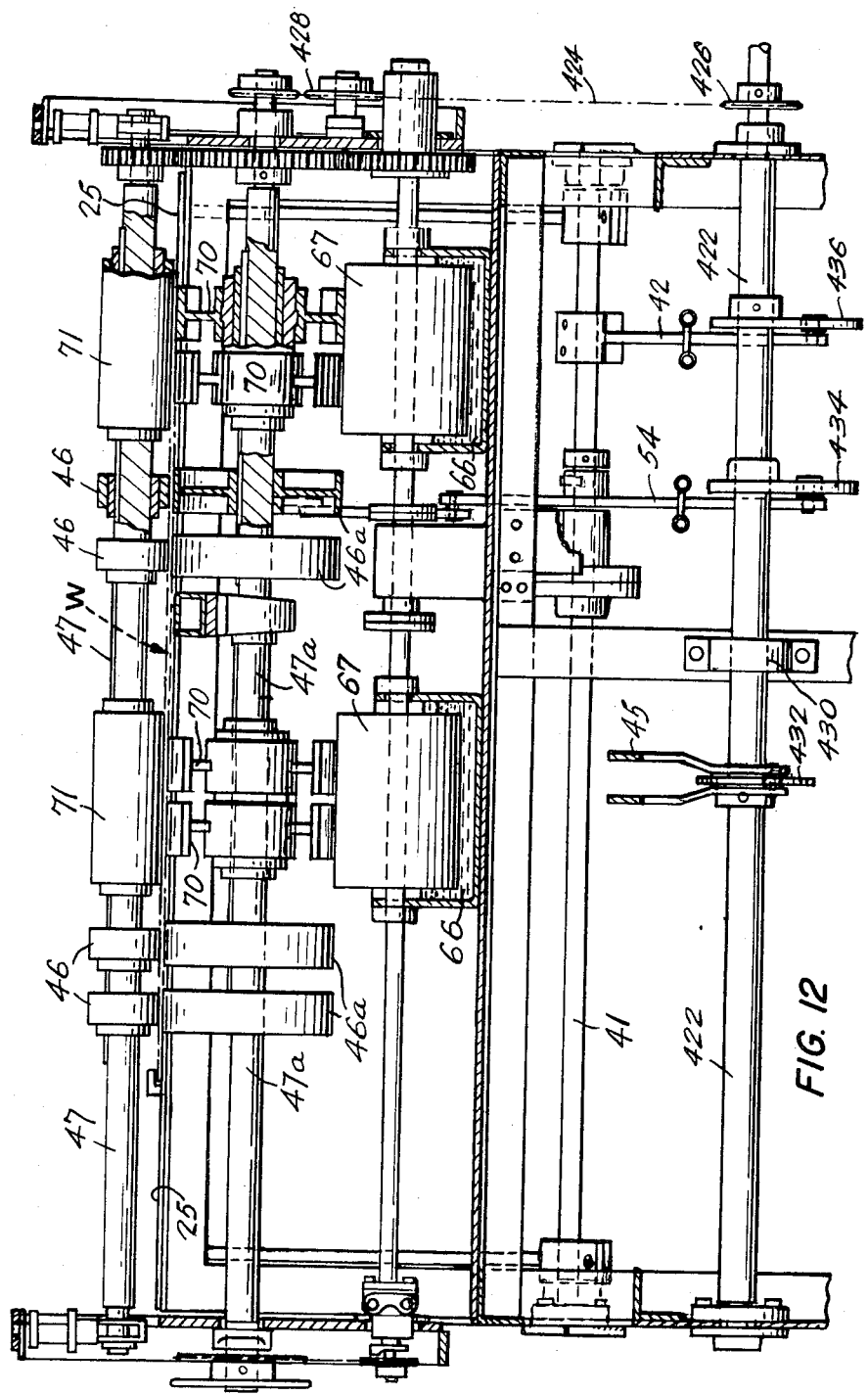

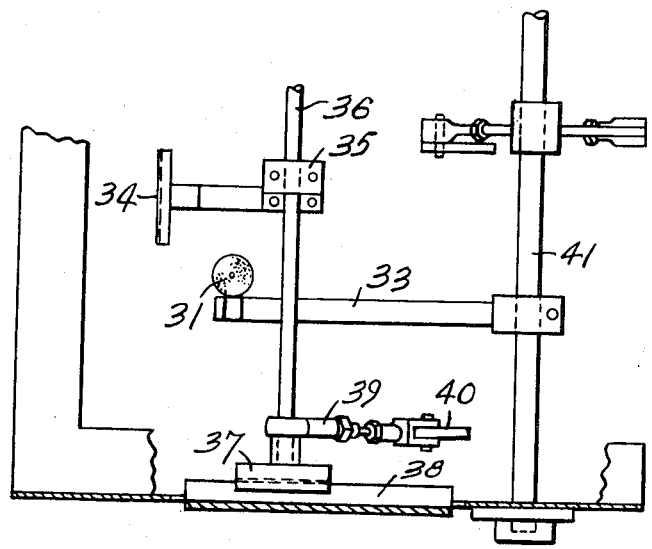
FIG. 14
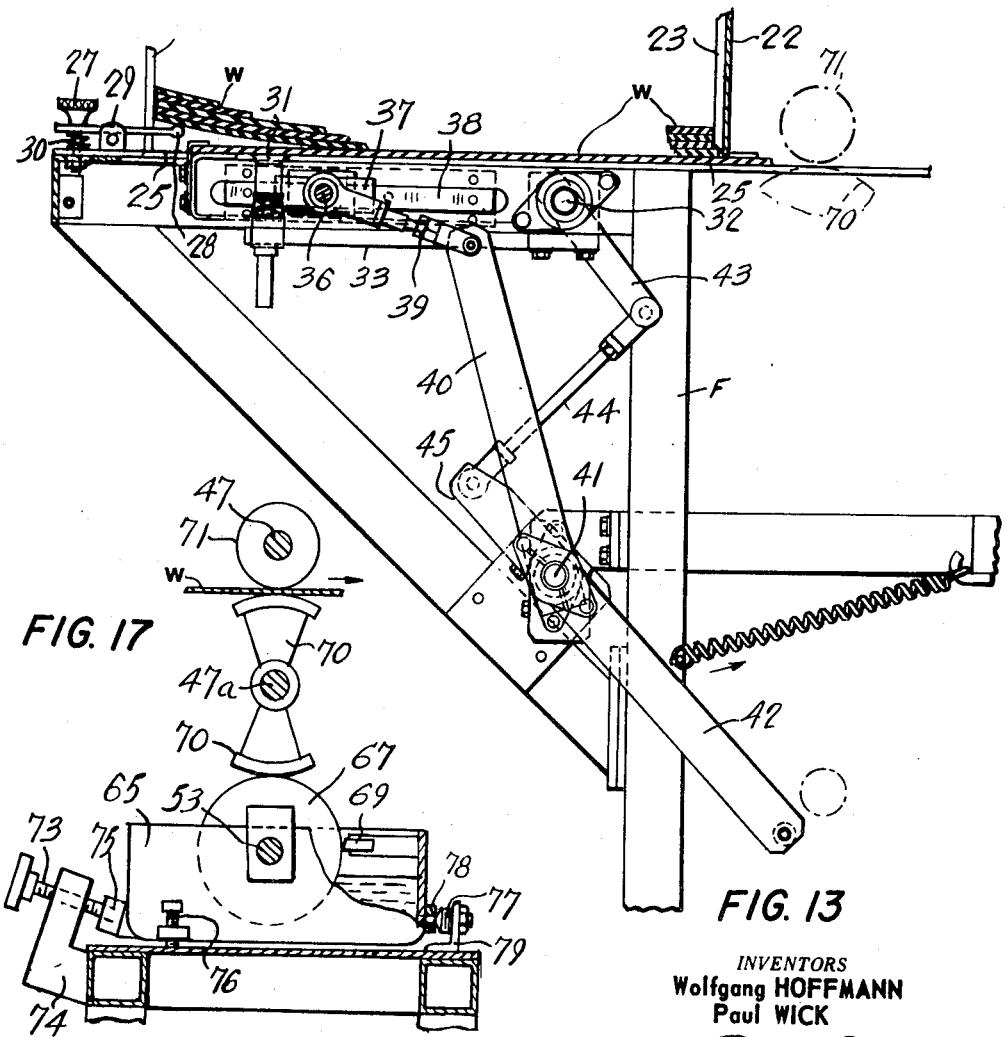
FIG. 17
FIG. 13
INVENTORS
Wolfgang HOFFMANN
Paul WICK
Alan Sunley
ATTORNEY

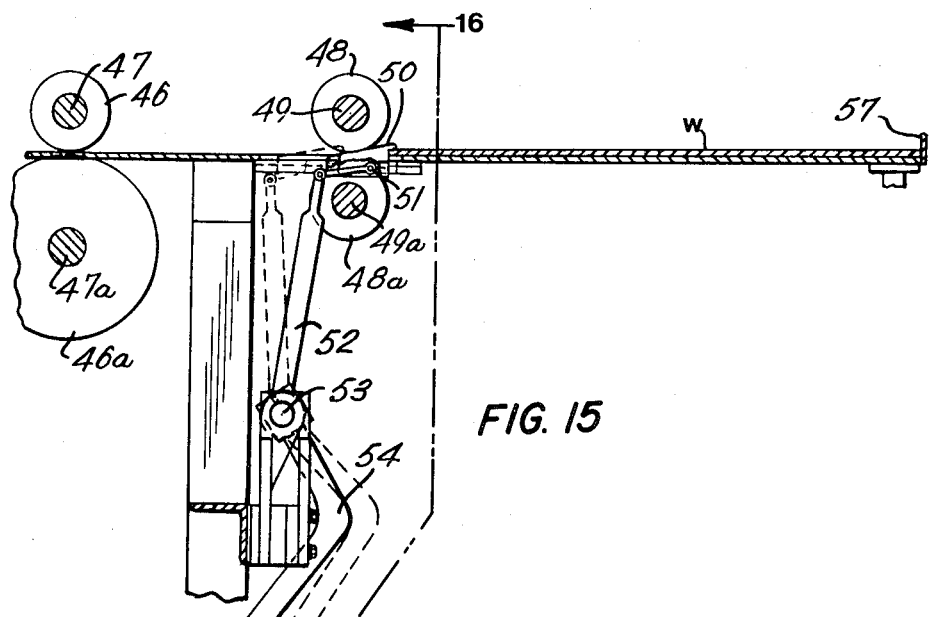
*FIG. 15*
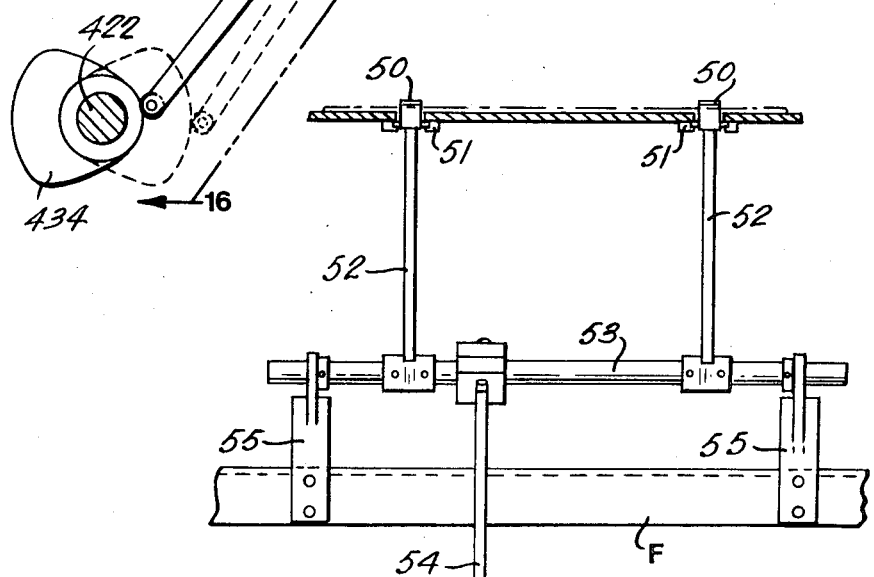
*FIG. 16*
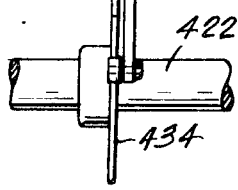

INVENTORS
Wolfgang HOFFMANN
Paul WICK

ATTORNEY

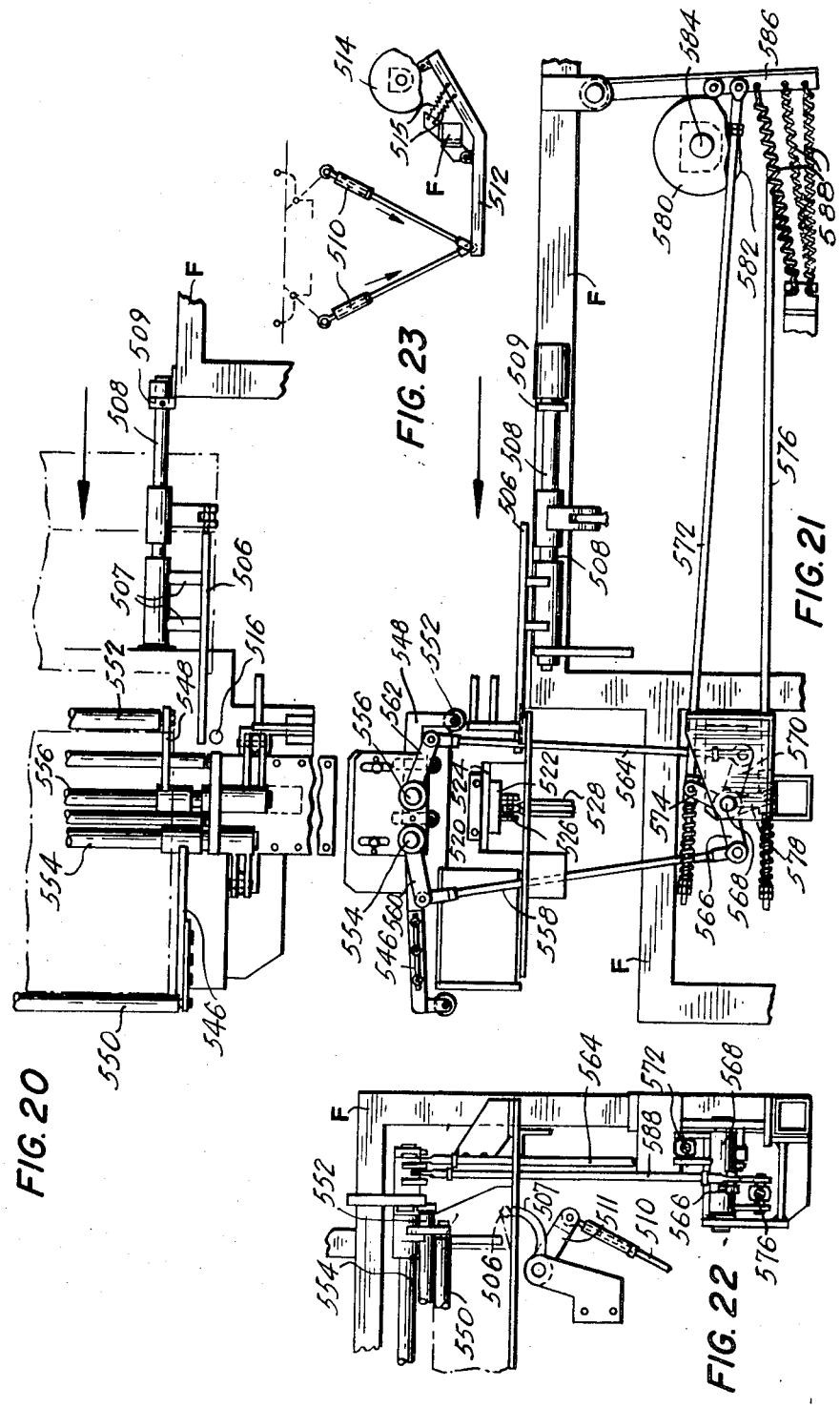

INVENTORS
Wolfgang HOFFMANN
Paul WICK

ATTORNEY

PACKAGING APPARATUS

This application is a continuing divisional application on applicant's copending U.S. application, Ser. No. 734,029, filed June 3, 1968, now U.S. Pat. No. 3,579,956 issued May 25, 1971.

BACKGROUND OF THE INVENTION

1. Field of the Invention

This invention relates to a wrapping apparatus.

More particularly, one aspect of this invention relates to an apparatus for feeding a predetermined number of selected commodities from an array of such conveyors and presenting such commodities from an array of such conveyors and presenting such commodities to a wrapping device for wrapping the selected commodities.

2. Description of Prior Art

In the art of wrapping commodities, there are various known devices and methods which present commodities to a wrapping apparatus, which commodities are to be packaged in a wrapped bundle. Part of the problem in attaining and retaining a high speed wrapping operation is the speed at which the commodities are presented to the wrapping device for wrapping. It has been common in this art to feed an array of commodities to a wrapping device by conveying means and pushing a predetermined number of packages from the conveying means into the wrapping apparatus, using a reciprocating pusher or the like. In other methods and apparatus, such as those shown in U.S. Pat. No. 2,013,555 and U.S. Pat. No. 2,869,297, commodities are fed to a wrapping operation along conveyors, where they are placed in arrays, with the conveyor directly advancing the commodities to a wrapping operation without the commodities having been prearranged by other suitable components prior to being fed to the wrapping components.

It is most desirable, in feeding commodities to a wrapping apparatus, to be able to maintain a high speed feed, which is accurate and presents the commodities to the wrapping apparatus whereby the first wrapping operation can be carried out without preliminary steps of aligning or awaiting the desired number of commodities to be placed in the wrapping apparatus. Further, in order to ensure a high speed operation, it is also desirable that the commodities be preselected into arrays to be wrapped just prior to introduction into wrapping operation whereby any given array does not have to travel any sufficient distance prior to being wrapped, in order to avoid possible disruption of the array. To this end, applicant has developed an improved feeding apparatus for presenting a prealigned and selected number of commodities to a wrapping apparatus whereby the wrapping apparatus may commence an initial wrapping operation without preliminary steps or the necessary equipment, to maintain any aligning or other operations. Further, the improved apparatus of this invention permits a very fast feeding operation, thus permitting the total wrapping operation to proceed at a faster rate of speed.

SUMMARY OF THE INVENTION

In accordance with one aspect of this invention, there is provided an apparatus for aligning and selectively feeding a commodity, from a plurality of such commodities, to a wrapping apparatus which includes first advancing means for advancing a plurality of commodities, means for aligning said commodities, while advancing, into predetermined alignment, selecting means for selecting a predetermined number of aligned commodities, second advancing means for advancing the selected commodities and presenting said commodities to a wrapping device, said second advancing means advancing said commodities to said wrapping device at a rate faster than the advancement of said commodities by said first advancing means, means for preventing unselected commodities from advancing to said wrapping device when said second advancing means is advancing said selected commodities.

In accordance with an alternate aspect of this invention, a further embodiment of applicant's apparatus includes a pair of spaced apart upper and lower commodity feeding systems, each system being adapted to supply an array of commodities to the wrapping apparatus, and including first advancing means for advancing a plurality of commodities toward said wrapping apparatus, means for aligning a plurality of wrapping apparatus into an aligned array while being advanced by advancing means, said lower system including second advancing and selecting means for selecting and feeding to said wrapping apparatus, in the feeding direction of said first advancing means a predetermined number of the aligned array of commodities at a speed greater than the speed of advancement of the commodities by said first advancing means, said upper system including second advancing and selecting means for advancing and selecting, in the feeding direction of said first advancing means, a predetermined number of the aligned array of commodities at a speed greater than the speed of advancement of said first advancing means, said upper and lower systems each including means for preventing unselected aligned commodities from advancing past a leading point at which said commodities were selected by said second means, first retaining and supporting means for receiving the selected advanced aligned array from said second means of said upper system, second retaining means for retaining and supporting a selected aligned array, said second retaining and supporting means being located in operative relationship to said first retaining and supporting means and to the point of advancement of an aligned array by said second advancing means of said lower system, first placing means for placing a selected aligned array from said first retaining and supporting means onto said second retaining and supporting means, second placing means for placing an aligned array from said second retaining and supporting means into juxtaposition with an array of commodities advanced by said second advancing means from said lower system, means for operating said second advancing means of said upper and lower systems in unison whereby said lower system advances a selected aligned array to said wrapping apparatus and said second advancing means of said upper system advances a selected aligned array to said first supporting means, means for actuating said second placing means and said second advancing means of said lower system in unison whereby said second placing means places a selected aligned array from said second retaining means in juxtaposition with an advanced array from said second system, and means for operating said first placing means in conjunction with said second placing means whereby said first placing means places a selected aligned commodity from said first retaining means onto said second retaining means after said second placing means has removed an array therefrom.

According to a further aspect of this invention, there is provided a method of aligning and feeding an array of commodities from a plurality of unaligned commodities which includes the steps of providing a source of unaligned commodities, advancing the unaligned commodities at a predetermined rate of speed, causing said commodities to be aligned into an array of aligned commodities, while advancing said commodities, selecting a predetermined number of aligned commodities and advancing the selected predetermined aligned commodities to a wrapping operation, while preventing further aligned unselected commodities from advancing beyond the leading point at which the commodities were selected, the step of advancing the commodities after selection being carried out at a faster rate of speed than the speed at which the commodities are advancing, and presenting the advanced commodities to a wrapping apparatus.

In a preferred embodiment of the method of the present invention, two feeding operations are carried on simultaneously whereby juxtaposed layers of commodities may be fed to a wrapping apparatus. To this end, the method includes the steps of providing two spaced apart parallel sources of unaligned commodities, advancing the unaligned commodities from each source at a corresponding predetermined rate of speed to a wrapping operation, causing the commodities from each source to be aligned into rows of commodities, selecting and advancing a first predetermined number of commodities to one of said sources and feeding the selected commodities to a wrapping operation from said one source and halting the movement of commodity at that point thereby to form a first aligned array, selecting and advancing a corresponding predetermined number of commodities from said other source and advancing the selected commodities to an intermediate zone and halting the movement of the thus advanced commodity in said intermediate zone, thereby to provide a second aligned array, providing a third aligned array of a corresponding predetermined number of commodities from said other source, placing said third array in juxtaposition with the first array of predetermined number of commodities, presenting the combined juxtaposed pre-aligned arrays of commodities to a wrapping operation, transferring said second array from said intermediate zone to provide said third array, and repeating the steps sequentially.BRIEF DESCRIPTION OF THE DRAWINGS Further features, objects and advantages will be evident from the following detailed description of a preferred embodiment of the present invention taken in conjunction with the accompanying drawings in which:

FIG. 3 is a partial side elevation of a two-system feeding device according to a further aspect of this invention, and shown in combination with a wrapping apparatus; (showing the first operation position);

FIG. 4 is a side elevation of the device of FIG. 3 taken along the line 4—4 of FIG. 3;

FIG. 5 is a top plan view of the apparatus of FIG. 3;

FIG. 6 is a side elevation of the apparatus of FIG. 3 showing the second sequence in the operation of the device;

FIG. 7 is a view similar to FIG. 6 but showing the third sequence of operation;

FIG. 8 is a view similar to FIG. 6 but showing the fourth sequence of operation;

FIG. 9 is a view taken from the right hand side of the apparatus of FIG. 3 but showing the arrangement of a preferred drive system for operating various components in time-related sequence;

FIG. 12 is a section taken along the line 12—12 of FIG. 10;

FIG. 13 is a section taken along the line 13—13 of FIG. 11;

FIG. 14 is a plan view of FIG. 13;

FIG. 15 is a section taken along the like 15—15 of FIG. 11;

FIG. 16 is a section taken along the like 16—16 of FIG. 15;

FIG. 17 is a side elevation of a portion of the gluing apparatus.

DESCRIPTION OF PREFERRED EMBODIMENTS

Figure 1:
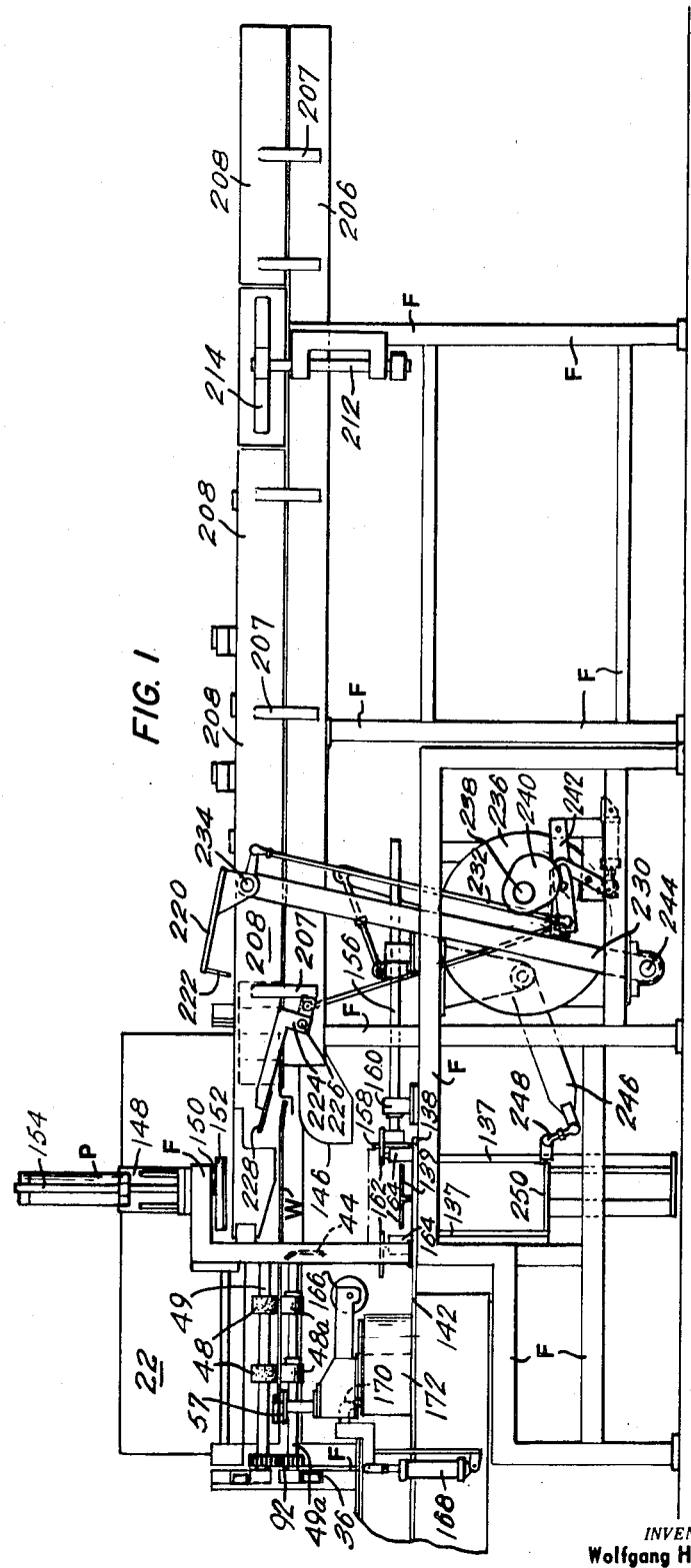
FIG. 1 is a side elevation of a single system feeding device, in conjunction with a wrapping apparatus.

In the drawings, like reference numerals designate like parts; and the various frame members supporting various components are indicated by the letter F.

Referring to the drawings, the apparatus includes an upper zone or station defined in part by a supporting surface 25 and guides 56 on either side thereof, a downwardly movable elevator platform 138, and lower station or zone 142.

A first component to be described is the wrapper storage and wrapper feeding mechanism. This mechanism is located at the upper station, mounted on supporting platform 25.

The platform 25 is mounted to a frame member F, with guides 22 defining therebetween a wrapper storage area for wrapper blanks W. The guide 22, in the forward direction of feeding of the wrapper blank (towards the elevator platform) is spaced from the supporting surface 25, a distance equivalent to the thickness of one blank. This same guide 22 includes spacers 23 extending in the vertical direction of the guide and terminating a short distance above the terminal point of the bottom of the forward guide. This arrangement will permit, as shown in the drawings, all but the last or lowermost wrapper blank W to be spaced slightly outwards from the forward guide 22 and the lowermost blank to be exposed to the opening between the guide 22 and supporting surface 25, and the second lowermost blank to be in a position to be pre-selected.

The wrapper storage area is constructed at the rear end of the storage area, to include a manual adjustment for raising the trailing end of the wrapper blanks in order to compensate for warped or distorted sheets of wrapper and in order to insure the positive positioning of the leading edge of the lowermost blank for feeding between the aperture of the front guide 22 and the supporting surface 25. The device consists of an adjustable spindle 27 and a pivotably mounted supporting rod and a bearing 29. The spindle 27 contains a spring 30.

The wrapper selecting and advancing means, as previously mentioned, is a four-component assembly. The first component comprises a pair of spaced-apart suction cups 31 each mounted on a shaft 32. Shaft 32 is connected to the suction cups by means of a lever 33, permitting vertical movement of the suction cups 31. Operating in conjunction with the suction cups are means for selecting the lowermost wrapper blank engaged by the suction cups comprising a pair of U-shaped brackets 34. Brackets 34 are connected to arm 35 mounted, in turn, on a movable shaft 36. Shaft 36 is supported by parallel slide members 37 sliding in a bar 38. Shaft 36 is connected through a connecting rod 39 to a movable arm 40 which is pivotally mounted on shaft 41. Shaft 41 is connected to lever 42, whose movement is controlled by a central or common drive system, hereinafter described. Lever 43 is connected via connecting rod 44 to a drive lever 45 which rotates on shaft 41. Lever 45 is driven through the common drive system, as hereinafter described.

The second component for advancing a selected wrapper by the above-described means comprises a pair of spaced-apart drive rollers 46 and 46a mounted on rotatably shafts 47 and 47a driven by a drive system hereinafter described. Operating in conjunction with the last-mentioned means is a third component comprising a further pair of spaced-apart drive rollers 48 and 48a, mounted on rotating shafts 49 and 49a. Shafts 48 and 48a are driven by means hereinafter described.

The fourth component of the wrapper advancing assembly comprises a spring-loaded clip assembly adapted to advance the wrapper the final distance required to the elevator platform at the upper station of the apparatus. The spring clip assembly comprises a U-shaped spring 50 mounted on a parallel slide mechanism 51 which in turn is driven by a connecting arm 52 through a pivotally mounted shaft 53, the shaft being rotated by a lever 54 driven by the central drive system hereinafter described. Shaft 54 is mounted to a sub-frame member F, by means of brackets 55.

The upper platform of station of the apparatus includes guides extending from the wrapper storage area to either lateral side of the elevator platform, the guides comprising U-shaped members 56, with stops 57 defining the limit of the forward movement of the wrapper advanced by the wrapper selecting and advancing means.

Operating in conjunction with the wrapper selecting and advancing mechanism, according to one embodiment of this invention, is glue-applying means adapted to apply glue to selected portions of the wrapper as it is advanced. According to this embodiment, the glue applying means is mounted beneath the supporting platform 25 in the direction of feed of the wrapper blank and comprises a pair of glue baths 65 containing glue 66 therein. Any suitable means for feeding the glue into the baths and for maintaining the level of the glue therein may be employed.

Rotating in the glue baths 65 are a pair of glue wheels 67 journalled on a shaft 53 driven by means hereinafter described. Glue wheels 67 pick up, on their surface, glue from the bath. The amount of glue picked up by the wheels 67 is regulated by a doctor blade 69. Operating in conjunction with and contacting the glue wheels 67 are rotatable glue applying segments 70 connected to the shaft 47a. Supporting surface 25 contains a plurality of apertures therein, permitting segments 70 to contact the underside of an advancing wrapper fed by the previously described means. Operating in conjunction with the glue applying segments 70 are rollers 71 adapted to maintain the advancing wrapper in contact with the glue applying segments as the wrapper is advanced. Rollers 71 are mounted on shaft 47 just mentioned.

The glue applying segments are so constructed that their glue applying surfaces correspond to the width of the wrapper portion to be coated with adhesive. Thus, the length of the arch described by the glue applying segments preferably equals the width of the portion of the wrapper to be treated with glue. Shaft 47, connected to sub-assembly frame members, is spring loaded by means of springs (not shown) to maintain downward pressure on the wrapper as the wrapper is advanced. The shaft 47a is also suspended to maintain a proper distance between the rollers 67 and the glue segments 70.

The glue system may be adjusted to permit raising or lowering of the glue system. To this end, a manually adjustable pin 73, mounted in a bracket 74 connected to the frame abuts a sloping block 75 connected to the glue bath 65, on one side thereof. The glue bath 65 is mounted to a frame by means of a manually adjustable threaded screw arrangement 76, normally resting in a position slightly spaced from the frame.

On the opposite side of the glue bath 65 to the adjustable member 73, is a conical shaped pin 77 connected to a bracket 79 mounted to the frame, with the glue bath 65 being connected to the pin by means of a hollow bushing 78. In this manner, by tightening the adjustable pin 73, the glue bath may be adjusted.

The commodity wrapping device of the apparatus includes a downwardly movable elevator platform 138 operating between upper station or zone 25 and a lower station or zone 142. The upper station and platform is the level at which a wrapper is fed into position on the elevator platform. Guides 144 and 146, located between the upper and lower stations, serve to juxtapose opposed lateral side portions of the wrapper blank to the commodity as the latter is lowered on the wrapper blank on the elevator platform 138. Elevator platform 138 is driven by suitable means, hereinafter described, with guides 137 serving to guide the elevator platform 138 as it descends.

In the embodiment shown in FIG. 1, there is provided a pusher P adapted to operate in conjunction with the elevator platform 138 wherein a commodity placed on a wrapper W is lowered onto elevator platform 138 with the pusher P aiding in retaining and lowering the commodity between the upper and lower stations. Pusher P comprises a pressurized operated piston assembly including housing 148, piston rod 150, which mounts a shoe 152 and guides 154 guiding the lowering of the piston rod 150.

The second component for folding in additional portions of the wrapper into juxtaposition with the transverse sides of the commodity is mounted at the lower station and comprises two pairs of movable arms 162 on either transverse side of the lower station. The movement of arms 162 is tied in with the overall operation of the apparatus, and these arms serve to juxtapose first transverse side wrapper portions, extending from the lateral side panels of the wrapper, to the transverse sides of the commodity. Also, mounted at the lower station are third folding means for juxtaposing the bottom portion of wrapper material, extending from both transverse sides of the wrapper, to overlie the folded-in transverse wrapper portions. These third folding means comprise a T-shaped bar 139, operating in conjunction with the lowering of the elevator platform whereby after the arms 162 fold in the first transverse wrapper flaps, T-shaped bars 139 are actuated to fold upwardly the bottom transverse wrapper portions to overlay the juxtaposed wrapper portions.

Mounted to the rear at the lower station of the wrapping apparatus, there is provided means for advancing a partially wrapped commodity off the elevator platform 138 comprising a pusher assembly consisting of pusher rod 156 mounting at one end a push plate 158. Rod 156 is movably journalled in housing 160 connected to frame F. The pusher rod 156 is actuated by means hereinafter described.

The wrapping device, in the embodiments illustrated, further includes means for folding down the top wrapper panel to the top of the commodity, and means for juxtaposing a manufacturer's flap to a further portion of the wrapper, according to the teachings of our copending application Ser. No. 772,603, filed Apr. 19, 1968. Briefly summarized, this includes roller 166 adapted to juxtapose a top panel to the commodity and piston assembly 168 operating on arm 170 (FIG. 1) which juxtaposes the manufacturer's flap. The partially wrapped commodities, after arriving at the lower station on the elevator platform 138 are advanced by pusher means 156 and 158 along platform 142 into engagement with a pair of spaced-apart moving belts 172 which then take control of the commodity and perform the closing of the manufacturer's flap according to said copending application.

Figure 2:
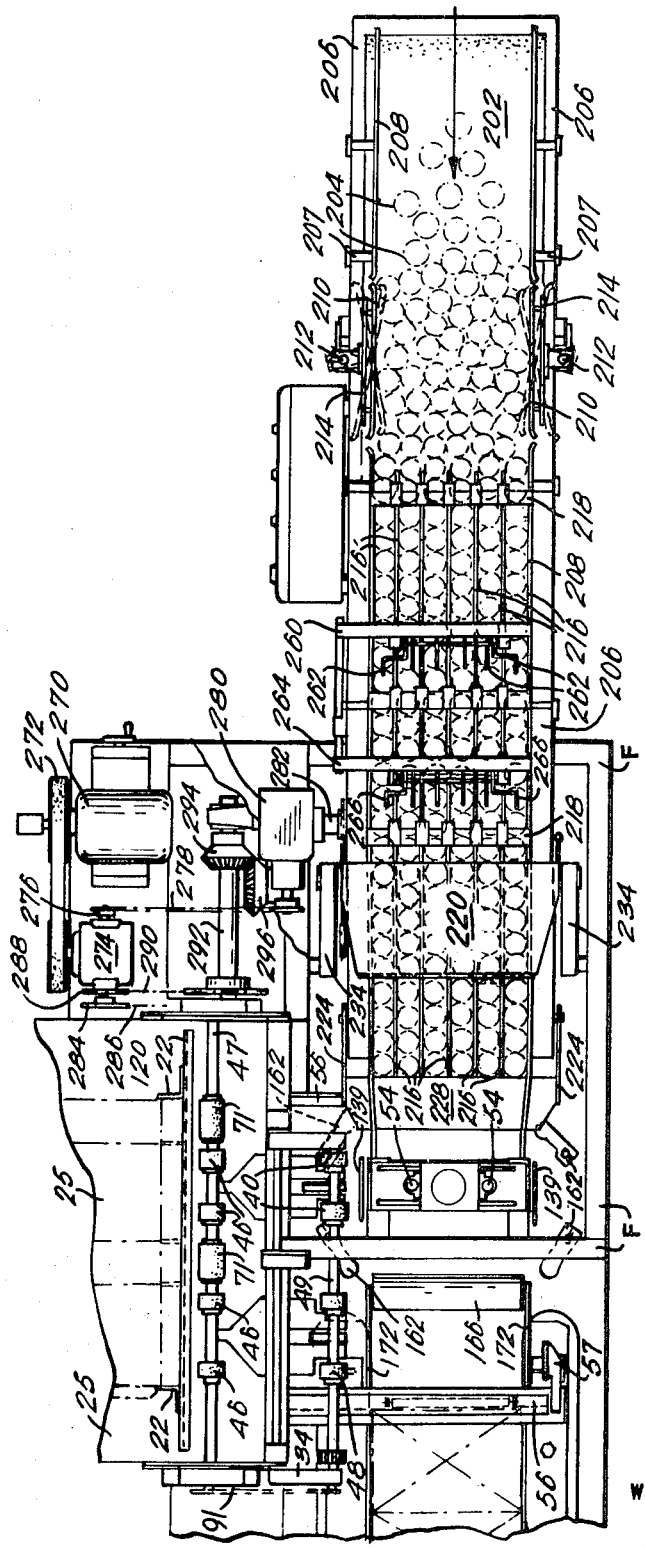
FIG. 2 is a top plan view of the device of FIG. 1.
Figure 11:
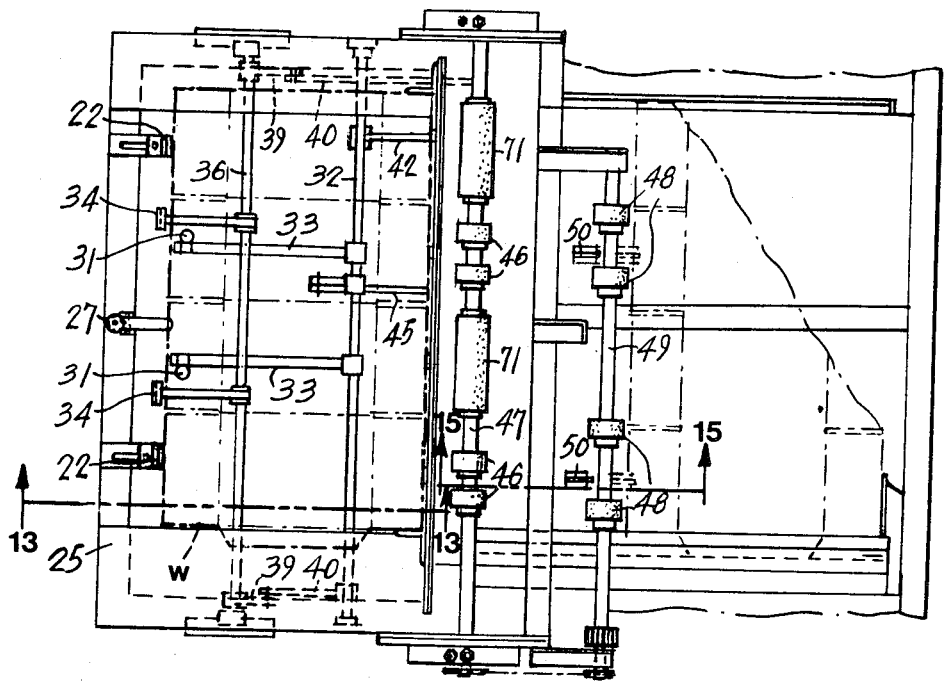
FIG. 11 is a top plan view of the device shown in FIG. 10.

Referring now to the embodiment of the invention illustrated in FIG. 1, the feeding mechanism includes a supporting surface 202 defined by a movable conveyor belt which is adapted to advance commodities towards the wrapping device above described. As shown in FIG. 2, a plurality or radially arranged commodities, for example tin cans 204, are placed on the supporting surface from a prior operation, e.g. a filling operation, and advanced in the direction of the arrow shown in FIG. 2.

Conveyor 202 is mounted on supports 206 connected to the frame F, and includes side guides 208 connected thereto by supports 207, for preventing commodities from falling off its surface. Oscillating means defined by movable side sections 210 located between the guides 208 are adapted to juggle the commodities, on the conveyor 202, to aid in aligning them in the alignment means subsequently described. Plates 210 are oscillated by means of shaft 212 connected to the plates 210 through housing 214. In turn, shafts 212 are oscillated or vibrated by suitable means (not shown).

Means for aligning the commodities as they are advancing on the conveyor 202 comprises a plurality of spaced-apart vertical guides 216 mounted above the conveyor by means of supports 218 connected to the sides 208. In this manner, the commodities as they are advanced on the conveyor 202 are subject to minor oscillations or vibrations from plates 210 and placed into the guide channels by adjacent guides 216 whereby the commodities form prealigned rows for a subsequent operation.

The means for selecting and advancing a predetermined number of commodities to the sheet wrapper W on the elevator platform 138 as shown in detail in FIGS. 1 and 2 comprises a support 220 carrying the plurality of fingers 222, each finger being adapted to engage a row of aligned commodities in the guide channels defined by guides 216, and advance them onto the wrapper W. Operating in conjunction with support 220 is a barrier means defined by a pivotably mounted arm 224 pivoted by means of pins 226 mounted in supports 206. Arm 224 mounts a flat supporting plate 228, adapted to bridge the gap between the terminal point of advancement of the conveyor 202 and the wrapper W on the elevator platform 138 at the upper station. Plate 228 also serves as a barrier means as will be described in greater detail.

The selecting and advancing means 220 operates from a central drive system (described hereinafter) through arm 230 and rod 232 whereby rod 232 causes support 220 with fingers 222 to be lowered into a position for engaging a plurality of commodities, while arm 230 will cause advancement of the support 220 with fingers 222 to advance the commodities through the guide channels and onto the wrapper W. To this end, support surface 220 is pivotably mounted on arm 230 by means of pivot 234.

The arm 224 and supporting surface 228 are timed to operate in conjunction with the support advancement of arm 230, by suitable means, whereby when fingers 222 engage aligned commodities in the guide channels defined by guides 216, support surface 228 is in a horizontal plane and in juxtaposition with wrapper W whereby the commodities may be advanced onto the wrapper. On the return stroke of the arm 230 whereby rod 232 is actuated to lift fingers 222 from the guide channels (to the level shown in FIG. 1) the supporting surface 228 returns to the position shown in FIG. 1 thereby preventing non-selected commodities from advancing to the wrapper W.

The central drive system for operating the various means of the apparatus described above is shown in FIG. 1, and comprises a rotatably shaft 238 driven by an electric motor, as hereinafter described. Mounted on the shaft 238 are a plurality of eccentric cams serving to operate various components. Thus, for example, operating in conjunction with cam 240 is arm 242 rotatably journalling rod 232 whereby the eccentric movement of the cam 240 causes arm 242 to move up and downwardly, thus causing fingers 222 to move upwardly and downwardly into commodity-engaging and commodity-disengaging positions. Arm 230 is rotatably journalled on connecting shaft 244, connected to an eccentric cam mounted on rotatable shaft 238 whereby the eccentric cam, when rotated, will cause arm 230 to operate in forward and return strokes, thus advancing and returning supporting surfaces 220 and fingers 222 in a commodity advancing and return stroke.

In a like manner, the elevator platform is operated through arm 246 and linkage 248 connected at one end to a guide 137. The other end of arm 246 is connected to a further eccentric cam mounted on shaft 238 whereby movement of the cam will cause movement of the arm 246.

The central control system described above, is further illustrated in FIG. 9 and will be described in greater detail with reference to a further embodiment of the invention.

The apparatus shown in the drawings also includes detecting and safeguard means which are explained as follows. Detecting means 260 mounted above the conveyor 202 is adapted to determine the feed of the commodities through guide channels defined by guide 216. Detecting means 260 comprises a plurality of sensing fingers 262 extending over the guide channels and should there be no commodity feed through the guide channel, the detecting means will prevent feeding of a wrapper blank. A further detecting means 264, on the same principle, as detecting means 260, and which includes fingers 266 also serves to indicate the presence of irregularly aligned commodities in the guide channels for the selecting and advancing means 220 and 222 to operate.

Thus, if an irregularly aligned commodity, such as a fallen can, passes by detecting means 260, the detecting means 264 will override the drive means of shaft 238 and thus prevent the sequence of operations for the various components to take place.

The conveyor drive means, and the means for driving the feed rollers of the wrapper feeding system, and the central drive means are shown in FIG. 2. This comprises an electric motor 270, driving belt 272 which in turn is connected to a reducer 274 through a shaft and pulley arrangement. Reducer 274, at one end, drives sprocket 276 rotating chain 278, which in turn, is connected to a reducer 280. Reducer 280 drives conveyor 202 through shaft 282 through a chain drive system.

Reducer 274 also serves to drive the shafts 47 and 47a through sprocket 284 and chain 286. Shafts 49 and 49a are driven by the rotation of shaft 47 which includes a pulley mounting a chain 91 connected to the other end to a pulley mounted on shaft 49. Both pairs of rotatable shafts 47 and 47a and 49 and 49a are connected by means of intermeshing gears — as shown in FIG. 1 by reference number 92. Also, the same take-off from reducer 274 mounts wheel 288 and chain 290 to rotate shaft 292 which is connected to a bevel gear 294. Bevel gear 294 meshes with further bevel gear 296, which is mounted at one end of the central drive shaft 238, as will be seen with regard to FIG. 9 describing a further embodiment.

Referring now to a further embodiment of this invention, the apparatus shown in FIGS. 3 to 9 is a variation of the apparatus of FIGS. 1 and 2, wherein there is included an upper and lower system of feeding commodities to a wrapping device. In these Figures, like reference numerals have been used to designate like parts described in FIGS. 1 and 2, with regard to the first advancing means on the upper and lower systems — i.e. the conveyor 202 and its related components, the wrapping device, including elevator platform 138, and the wrapper feeding mechanism, etc.

As will be seen in FIGS. 3 to 7, the upper and lower systems comprise spaced-apart identical feeding systems, vertically aligned with each other.

The means for selecting and advancing a commodity from aligned commodities on each of the upper and lower systems is in principle the same as that shown in FIGS. 1 and 2, and each system includes a supporting surface 320 with fingers 322 downwardly projecting therefrom, each finger 322 being adapted to be inserted into a guide channel defined by guides 216 for selecting and advancing a predetermined number of commodities.

Each of the upper and lower systems include means for preventing unselected commodities from advancing on the conveyor 202 comprising a pivotally mounted arm 324 and flat supporting plate 328. The arms 324 operate in unison through connecting arm 329.

The second means for advancing and selecting a predetermined number of commodities is driven by a central drive system as described hereinafter. This component includes arm 342 operating in conjunction with an eccentric cam which drives rod 332 connected at one end thereto and at the other end, through linkage 339, to supporting surface 320 through pivot 334, thereby serving to lower and raise the fingers 322 of the selecting and advancing means of the lower system. Rod 332' is connected to the rod 332 through a suitable linkage at one end thereof, and at the other end, through linkage 339' to the supporting arm 320 of the upper system through pivot 334' therefor, whereby the selecting and advancing means of the upper system operates in unison with that of the lower system system. the manner just described.

Also connected to common drive system is arm 330, through a pivot point 344 and a further linkage to an eccentric cam, serving to cause forward and reverse movements of the supporting surface 320 of the lower system in the manner described with respect to FIGS. 1 and 2. A further linkage system comprising arm 345 driven by the same eccentric can as arm 330, connecting rod 347 and arm 349, serves to cause forward and reverse movement of arm 351 connected to the supporting surface 320 of the upper advancing system. In this manner, both the advancing and selecting means of the upper and lower systems operate in unison.

The selecting and advancing means of the lower system operates to supply a pre-determined number of aligned commodities to a sheet wrapper in a manner identical to that described with respect to the apparatus of FIGS. 1 and 2. The selecting and advancing means of the upper system operates in conjunction with several additional components, now to be described. A supporting surface defined by a pair of horizontal support plates 353 and 353a are mounted in the same plane as conveyor 202 of the upper system, and in operative relationship to the supporting plate 328 thereof. Plates 353 and 353a are displaceable by means of piston assemblies 355 and 355a, each connected to the plates through connecting plates 357 and 357a, and operate along guides 359 and 359a. Plates 353 and 353a thus serve as removable retaining and supporting means for receiving and supporting a predetermined number of selected commodities by the upper selecting and advancing system.

Operating in conjunction with receiving and supporting plates 353 are various components for taking control of an aligned array of commodities of the plates 353 and 353a, and for placing the array into operative relationship into second receiving and retaining means. The first means for taking control of the array comprises in this embodiment a plurality of suction cups 361, mounted on supporting head 353, each suction cup being adapted to take control of an individual commodity of the aligned array. Supporting head 353 is mounted by means of supports 365 and 367 to a pair of vertically aligned guides 369 whereby the supporting head is movable in a vertical direction. Movement is caused by a piston assembly indicated by reference numeral 371 connected to the supporting head 363. Suitable means for creating suction to the suction cups 361 is also provided.

The second receiving and supporting means comprises a pair of spaced-apart supporting surfaces 373 and 373a, spaced vertically below and aligned with supporting surfaces 353 and 353a. Plates 373 and 373a are movable by means of piston assemblies 375 and 375a connected to the supporting plates through connecting plates 377 and 377a and operating on guides 379 and 379a. Thus, supporting plates 373 and 373a are separable, whereby a commodity placed thereon may be lowered in juxtaposition to an array of commodities advanced by the selecting and advancing means of the lower feeding system onto a wrapper blank in the manner described with respect to FIGS. 1 and 2, by actuating piston assemblies 375 and 375a to remove the supporting plates and permit the array to drop down onto the array advanced by the lower feeding assembly located on the wrapper at the upper station.

Referring now to FIGS. 6 to 8 in conjunction with the apparatus shown in FIG. 3, the commodity selecting and advancing means of the upper and lower systems is shown in the various stages of operation. In FIG. 3, the commodity advancing and selecting means is shown at the position it assumes at the beginning of a cycle in the operation of selecting and advancing a predetermined number of commodities — i.e. the commodity engaging fingers 322 supported by supports 320, are in a position whereby upon rotation of an eccentric cam of the central drive system and movement thereby of arm 342, rod 332 will cause supporting surface 320 to move downwardly and thus select a predetermined number of commodities in each of the guide channels defined by guides 216 to assume the position shown in FIG. 6.

The central drive system operating arms 345, 349 and 351, will then cause the fingers engaging the commodities to advance the selected number of commodities the desired length to place the commodities on supporting surface 353 and onto wrapper blank W, as shown in FIG. 7. In a subsequent operation, rods 332 and 332' will cause supporting surface 320 to rise at the end of the stroke as shown in FIG. 8, while arm 351 then moves the supporting surface 320 back to the initial position, as shown in FIG. 5.

At the time of forward movement of the supporting surfaces 320, supporting arms 324 with supporting surface 328 operating together in unison through connecting rod 329, are lowered from their raised position (as shown in FIG. 3) to a vertical position (as shown in FIGS. 6 and 7) thus permitting the commodities to be advanced onto the supporting surface 353 and the wrapper blank W, and thus lowering the barrier means which prevented the commodities from advancing on the conveyor 202 prematurely. As will be seen in FIGS. 3 and 7, the supporting surfaces 328 of the lower feed system also serves to hold down one side edge of the wrapper W in order to permit the commodities to easily slide onto the wrapper.

As will be seen in FIGS. 6 to 8, and for the purposes of "starting up" the operation, an array of commodities is placed on the supporting plates 373 and 373a. Thus, while the upper and lower feed systems are advancing a predetermined number of commodities onto the supporting surfaces 353 and 353a, and the wrapper W, the commodity which was on supporting surfaces 373 and 373a is lowered into juxtaposition with the commodity placed on the wrapper W by piston assembly 375 and 375a being actuated to remove the supporting surface 373 and 373a from supporting the commodity thereon, whereby it is lowered and placed on top of the commodity on the wrapper W. Subsequently, the first commodity placing means including suction cups 361 are lowered into juxtaposition with the commodity placed on closed supporting surfaces 353 and 353a, whereby they assume control of the commodity (as illustrated in FIG. 7) and piston assemblies 355 and 355a subsequently displace the surfaces 353 and 353a whereupon a first commodity placing means lowers the commodity onto supporting surfaces 373 and 373a, which were returned to a commodity supporting position by piston assembly 375 and 375a after placing a commodity in juxtaposition with the commodity on the wrapper W advanced by the lower feed system.

The operation of the single feed system illustrated in FIGS. 1 and 2 is carried out in a similar manner as that described above, with the exception that there is no feeding to an intermediate platform, but rather, the single feed system merely advances a commodity directly onto the wrapper W.

The central control and drive system of the apparatus will now be described with particular reference to FIG. 9. This central control system operates various components of the apparatus of this invention in timed intermittent sequence.

The electric motor 270 rotates, in a previously described manner, the main drive shaft 238 by rotating bevel gear 296. Mounted on shaft 238 are a plurality of eccentric cams. One of these cams, 407, moves pusher arm 404, which in turn is pivotally mounted to rod 402 rigidly connected to a cross-member 406. Cross-member 406 in turn is connected to sliding rod 156 of the commodity advancing assembly at the lower station. As shown in FIG. 9, the commodity advancing assembly preferably comprises two spaced-apart slidable piston rods whereby connecting rod 406 operates both in unison through a forward and return stroke.

The elevator platform 138, as previously mentioned, is lowered and raised in the downward and upward return stroke, by means of arm 246 connecting to the elevator platform by linkage 248. Arm 246 is moved by an eccentric cam 408 journalled on the shaft 238.

The means for selecting and advancing a predetermined number of commodities on the conveyor belts, previously described are actuated by means of arms 330 and 351 being moved by an eccentric cam 410 mounted on the shaft 238. As will be seen in FIG. 9, there are two sets of arms 330 and 351 on either side of the apparatus, which operate in unison through connecting shaft 345 when rotated by eccentric cam 410.

The barrier gates 328 are actuated by means of a further eccentric cam journalled on shaft 238, serving to move the arm 332.

In the above manner, the various components can be operated in the desired sequence according to the cam configurations.

The apparatus of this invention may include means for halting operation of the various components. To this end, as shown in FIGS. 5 to 8, a piston assembly 416 operating an arm 418 containing an opening 420 therein is adapted to engage arm 342 whereby the cam 412 will halt operation of the barrier gates 328.

Figure 10:
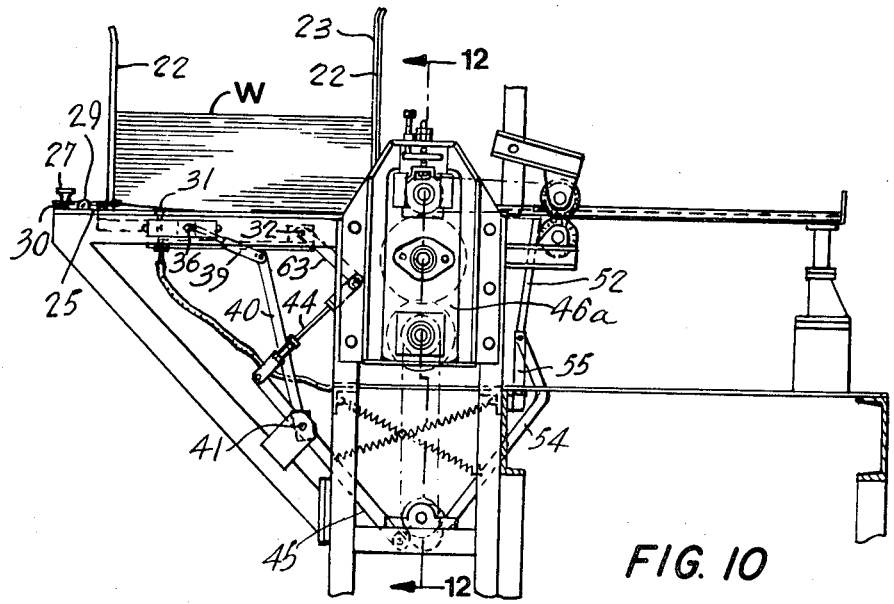
FIG. 10 is a side elevation of the wrapper storage and feeding system.
Figure 18:
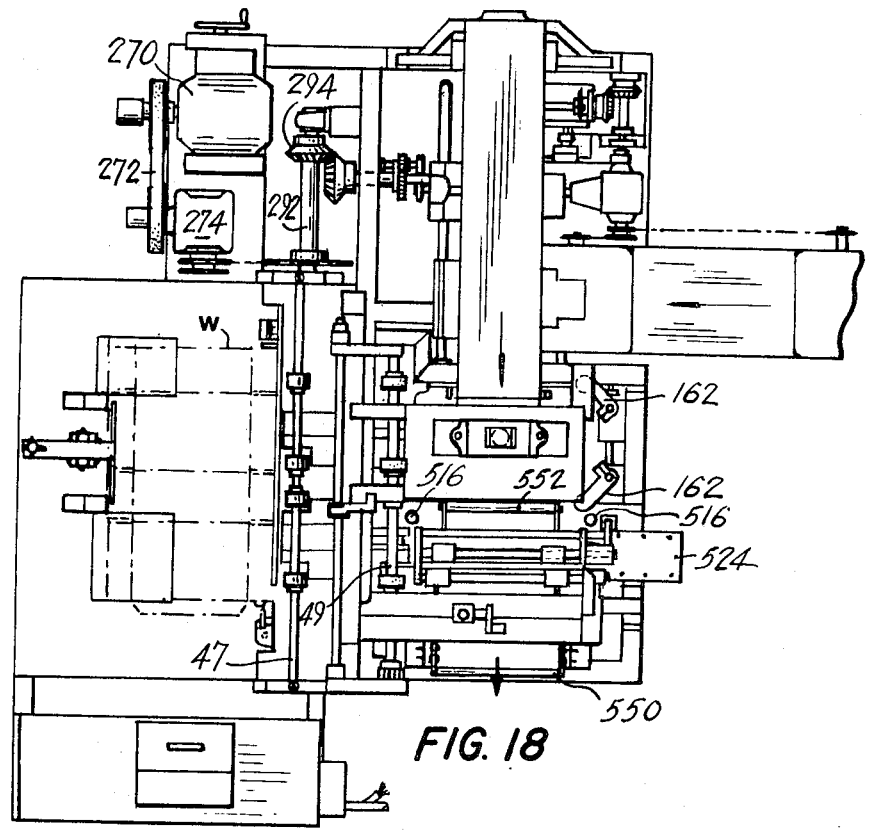
Figure 19:
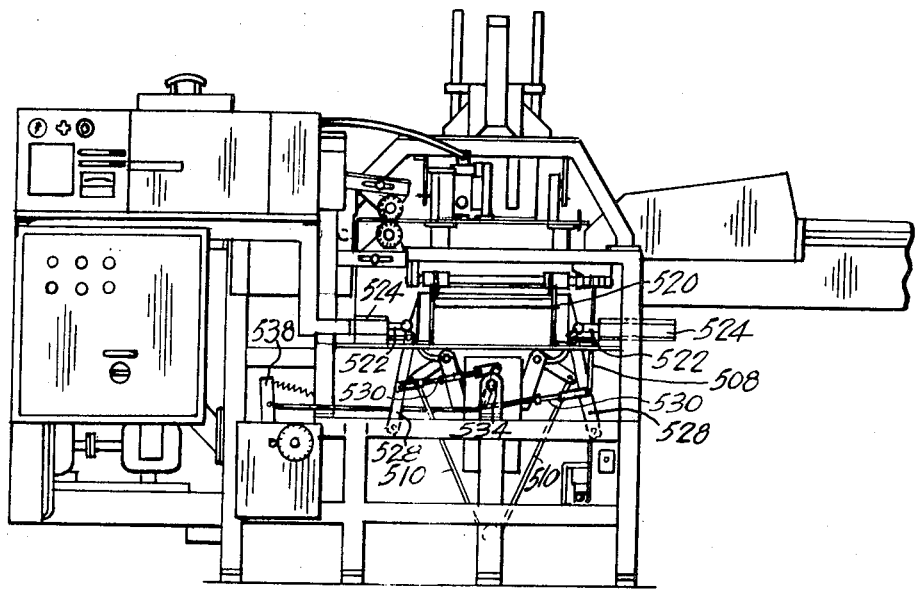
Figure 24:
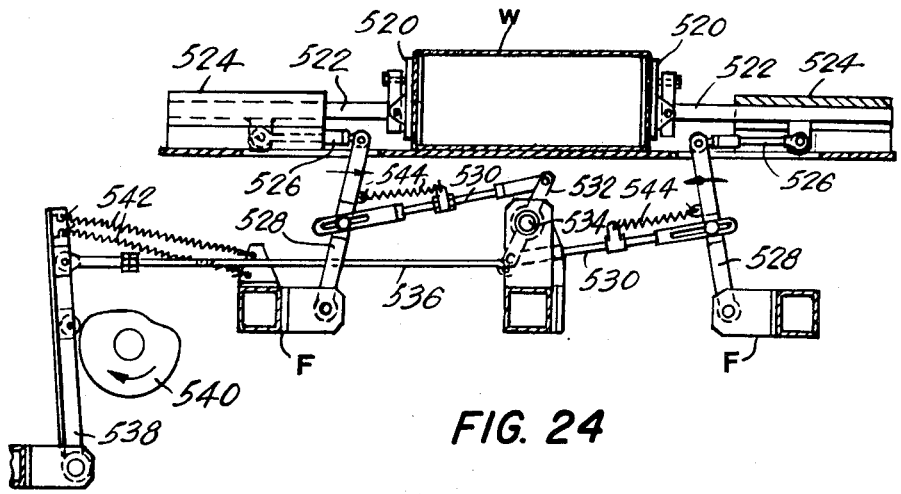
Figure 25:
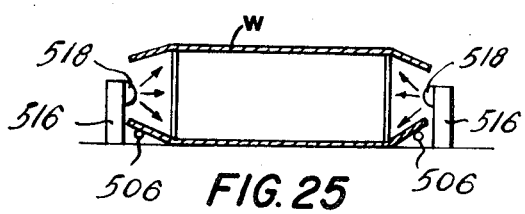

Referring now to a further drive system included in the apparatus, and shown more particularly in FIGS. 10 and 12, there is provided a rotatable shaft 422 driven by a chain 424, which rotates about sprockets 426 and 428. Sprocket 428 is connected to a shaft driven by the central drive system previously described. Shaft 422 is supported by a bracket 430 connected to a frame member F. Shaft 422 mounts a plurality of eccentric cams indicated by reference numerals 432, 434 and 436, of which eccentric cam 432 is operatively connected to lever 45. Likewise, lever 54 is operatively connected to eccentric cam 434 and lever 42 to eccentric cam 436. Spring members 438 and 440 connected at one end to frame members and at the other to shafts 45 and 54, retain the shafts in contact with the eccentric cams.

It will be understood that various modifications can be made to the specific embodiments of the invention without departing from the spirit and scope thereof.

We claim:

1. An apparatus for aligning and selectively feeding a commodity, from a plurality of such commodities, to a wrapping device comprising first advancing means for advancing a plurality of commodities in a direction toward the wrapping device, means for aligning said commodities, while advancing in the one direction, into predetermined alignment, selecting means for selecting a predetermined number of aligned commodities, second advancing means for advancing the selected commodities in the one direction and presenting said commodities to the wrapping device, said second advancing means advancing said commodities in the one direction to said wrapping device at a rate faster than the advancement of said commodities by said first advancing means in the one direction, and means for preventing unselected commodities from advancing to said wrapping device when said second advancing means is not advancing said selected commodities.

2. An apparatus for aligning and selectively feeding a commodity, from a plurality of such commodities, to a wrapping device comprising first advancing means for advancing a plurality of commodities, alignment means for arranging said commodities into predetermined alignment, selecting means for selecting a predetermined number of aligned commodities, second advancing means for advancing said selected commodities to a wrapping device at a rate faster than the advancement of said commodities by said first advancing means, means for preventing unselected commodities from advancing past a leading point past which said selected commodities would be advanced by said second advancing means, and means for operating said first and second advancing means, said selecting means, and said means for preventing unselected commodities from advancing in time related sequence whereby aligned commodities on said first advancing means are selected, said second advancing means advances the selected commodities to a wrapping device and said means for preventing advancement of unselected commodities prevents further commodities from advancing while said second means is not advancing the selected commodities.

3. An apparatus as defined in claim 2 wherein said first advancing means includes means for sensing the feed of the commodities, said sensing means operable in conjunction with said second advancing means whereby said second advancing means is inoperable when said first advancing means does not advance any commodities.

4. An apparatus, as defined in claim 2, wherein said first advancing means comprises a supporting surface for supporting said commodities, means for advancing commodities on said supporting surface to said second advancing means.

5. An apparatus as defined in claim 2 wherein said second advancing means comprises means for engaging a predetermined number of commodities on said first advancing means, means for operating said engaging means for advancing said engaging means to a wrapping apparatus, means for disengaging said engaging means from an advanced array of commodities, and means for returning said engaging means for engaging further commodities.

6. An apparatus as defined in claim 2 wherein said first advancing means comprises a moveable supporting surface, a plurality of guide channels on said supporting surface in the direction of advancement of said first advancing means, said selecting means comprising a plurality of commodity engaging means mounted above said supporting surface, each commodity engaging means adapted to engage a plurality of aligned commodities in each of the guide channels, means for lowering said plurality of commodity engaging means in unison into engagement with a predetermined number of commodities on said guide channel, said second advancing means being adapted to advance said plurality of commodity engaging means when in engagement with said commodities at a predetermined rate of speed faster than the rate of speed of said first advancing means, means for removing said commodity engaging means from commodity engaging position when said second advancing means has advanced said commodities to a wrapping apparatus, and means for returning said commodity engaging means to a commodity engaging position on said supporting surface.

7. An apparatus as defined in claim 2 wherein said means for preventing unselected commodities from advancing comprises barrier means, means for actuating said barrier means into commodity engaging position on said first advancing means, and means for removing said barrier means from commodity engaging position, said barrier actuating and removing means operating in conjunction with said second advancing means whereby said barrier actuating means prevents commodities from advancing on said first advancing means when said second advancing means is not advancing commodities.

8. An apparatus for aligning and selectively feeding a commodity, from a plurality of such commodities, to a wrapping device, said apparatus comprising a pair of spaced apart upper and lower commodity feeding systems, each system being adapted to supply an array of commodities to the wrapping device, and including first advancing means for advancing a plurality of commodities toward said wrapping apparatus, means for aligning a plurality of commodities into an aligned array while being advanced by said first advancing means, said lower system including second advancing and selecting means for selecting and feeding to said wrapping apparatus, in the feeding direction of said first advancing means a predetermined number of the aligned array of commodities at a speed greater than the speed of advancement of the commodities by said first advancing means, said upper system including second advancing and selecting means for advancing and selecting, in the feeding direction of said first advancing means, a predetermined number of the aligned array of commodities at a speed greater than the speed of advancement of said first advancing means, said upper and lower systems each including means for preventing unselected aligned commodities from advancing past a leading point at which said commodities would be advanced by said second means, first retaining and supporting means for receiving the selected advanced aligned array from said second means of said upper system, second retaining means for retaining and supporting a selected aligned array, said second retaining and supporting means being located in operative relationship to said first retaining and supporting means and to the point of advancement of an aligned array by said second advancing means of said lower system, first placing means for placing a selected aligned array from said first retaining and supporting means onto said second retaining and supporting means, second placing means for placing an aligned array from said second retaining and supporting means into juxtaposition with an array of commodities advanced by said second advancing means from said lower system, means for operating said second advancing means of said upper and lower systems in unison whereby said lower system advances a selected aligned array to said wrapping apparatus and said second advancing means of said upper system advances a selected aligned array to said first supporting means, means for actuating said second placing means and said second advancing means of said lower system in unison whereby said second placing means places a selected aligned array from said second retaining means in juxtaposition with an advanced array from said second system, and means for operating said first placing means in conjunction with said second placing means whereby said first placing means places a selected aligned commodity from said first retaining means onto said second retaining means after said second placing means has removed an array therefrom.

9. An apparatus as defined in claim 8 wherein said first retaining and supporting means comprises a support surface in operative relationship to said second advancing means of said upper system, said second retaining means comprising a supporting surface in operative relationship to said first retaining means, and means for transferring an aligned array on said first retaining means to said second retaining means.

10. An apparatus as defined in claim 8 wherein the means for transferring a commodity from said first retaining means to said second retaining means comprises means for engaging a commodity on said first retaining means, means for lowering said commodity from said first retaining means to said second retaining means.

11. An apparatus as defined in claim 10 wherein the first and second retaining means comprises moveable supporting plates, said apparatus including means for removing said supporting plates from supporting a commodity, said last mentioned means operating in conjunction with means for transferring a commodity whereby said means for transferring a commodity from said first to said second retaining means engages a commodity on said first retaining means, and said first retaining means is moved from supporting a commodity.

12. An apparatus as defined in claim 8 wherein said means for operating said first and second advancing means, said selecting means and said means for preventing unselected commodities from advancing comprises a single drive means, eccentrically mounted cams on said drive means, and means connecting said eccentrically mounted drive means to said first and second advancing means, said selecting means and said means for preventing said commodities from advancing.

13. An apparatus as defined in claim 3 wherein said second advancing means of said upper and lower systems are connected to common drive means, said drive means operating said second advancing of systems in unison, and comprising reciprocating drive means adapted to advance and return said second advancing systems a predetermined distance.

14. An apparatus as defined in claim 3 wherein there are provided common drive means for operating said upper and lower systems in unison, and comprising a drive shaft, an eccentric cam mounted on said drive shaft and connected to said second advancing and selecting means, a further cam on said drive system connected to said means for preventing unselected commodities from advancing.

15. An apparatus as defined in claim 14, wherein said selecting and advancing means of said lower system is connected to said cam, said selecting and advancing means of said upper system being connected to said selecting and advancing means of said lower system whereby said upper and lower systems operate in unison.

16. A method of aligning and selectively feeding commodities to a wrapping operation comprising the steps of providing two spaced apart parallel sources of unaligned commodities, advancing the unaligned commodities from each source at a corresponding predetermined rate of speed to a wrapping operation, causing the commodities from each source to be aligned into rows of commodities, selecting and advancing a first predetermined number of commodities to one of said sources and feeding the selected commodities to a wrapping operation from said one source and halting the movement of commodity at that point thereby to form a first aligned array, selecting and advancing a corresponding predetermined number of commodities from said other source and advancing the selected commodities to an intermediate zone and halting the movement of the thus advanced commodity in said intermediate zone, thereby to provide a second aligned array, providing a third aligned array of a corresponding predetermined number of commodities from said other source, placing said third array in juxtaposition with the first array of predetermined number of commodities, presenting the combined juxtaposed prealigned arrays of commodities to a wrapping operation, transferring said second array from said intermediate zone to provide said third array, and repeating the steps sequentially.

* * * * *